United States Patent
Deering et al.

[19]

[11] Patent Number: 5,963,200
[45] Date of Patent: Oct. 5, 1999

[54] VIDEO FRAME SYNCHRONIZATION OF INDEPENDENT TIMING GENERATORS FOR FRAME BUFFERS IN A MASTER-SLAVE CONFIGURATION

[75] Inventors: Michael F. Deering, Los Altos; Michael G. Lavelle, Saratoga; Alex N. Koltzoff, Sausalito; David C. Kehlet, Sunnyvale, all of Calif.

[73] Assignee: Sun Microsystems, Inc., Mountain View, Calif.

[21] Appl. No.: 08/914,973

[22] Filed: Aug. 20, 1997

Related U.S. Application Data

[63] Continuation of application No. 08/408,268, Mar. 21, 1995, abandoned.

[51] Int. Cl.$^6$ .................................................... G09G 5/00
[52] U.S. Cl. ............................. 345/213; 345/1; 345/504; 348/52
[58] Field of Search ..................................... 345/213, 504, 345/501, 1, 8, 9, 507–509; 348/51–53, 524; 365/189.25; 370/17

[56] References Cited

U.S. PATENT DOCUMENTS

| 4,720,708 | 1/1988 | Takeda et al. ........................... 345/213 |
| 4,904,990 | 2/1990 | Takeda et al. ........................... 345/213 |
| 5,021,775 | 6/1991 | Babin ....................................... 345/213 |
| 5,124,804 | 6/1992 | Socarras ................................... 348/524 |
| 5,281,957 | 1/1994 | Schoolman ................................ 348/53 |
| 5,394,171 | 2/1995 | Rabii ........................................ 345/213 |
| 5,448,554 | 9/1995 | Van Steenbrugge ...................... 370/17 |
| 5,500,819 | 3/1996 | Runas ................................. 365/189.05 |
| 5,523,886 | 6/1996 | Johnson-Williams et al. ........... 348/51 |

FOREIGN PATENT DOCUMENTS

| 0 096 628 | 12/1983 | European Pat. Off. ......... G09G 1/16 |
| 2 175 471 | 5/1985 | United Kingdom ............. H04N 5/04 |

*Primary Examiner*—Kee M. Tung
*Attorney, Agent, or Firm*—Blakely Sokoloff Taylor & Zafman

[57] ABSTRACT

A method and apparatus for synchronizing the vertical blanking of multiple frame buffers which may exist on the same computer or separate computers for certain applications including stereo display, virtual reality and video recording, which require such synchronization. To obtain the required synchronization one frame buffer is designation as the master. It provides a signal called FIELD that changes state (0 to 1 or 1 to 0) at the start of every vertical sync event on the master frame buffer. All other frame buffers are set to be slaves. Their timing generators sample the master's FIELD signal. When they detect the master's FIELD signal changing state, they set their own internal timing to match to thereby achieve frame synchronization.

13 Claims, 12 Drawing Sheets

FIG. 7  NTSC VIDEO TIMING

VIDEO TIMING GENERATOR-FIELD GENERATOR-MASTER MODE TIMING

Note 1  The interval T1 comprises the greater part of a video horizontal scan, during which this circuitry is inactive.
Note 2  The dotted lines in M5 Q and M6 FIELD represent the action of the circuitry in the field opposite to the one represented by the solid lines.

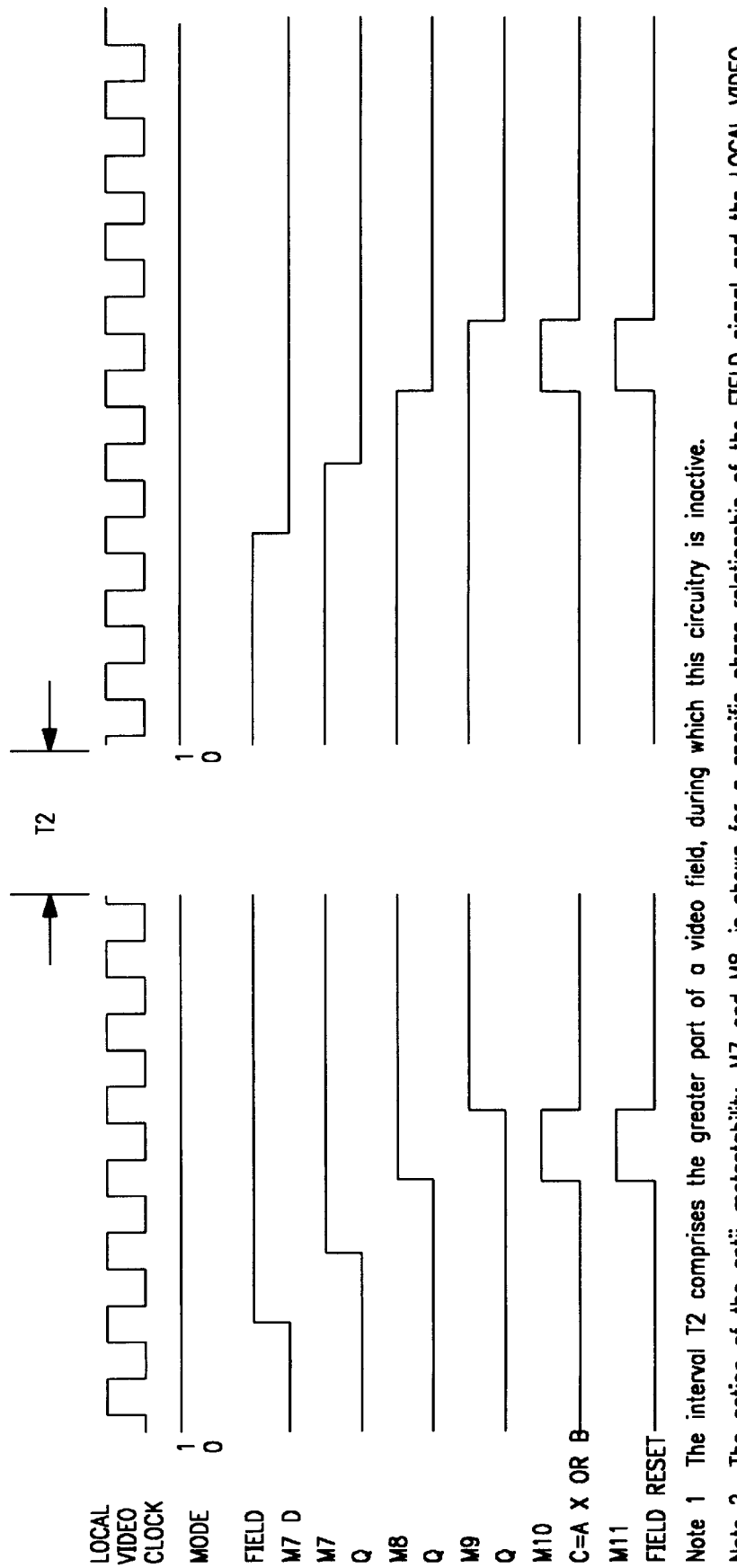
FIG. 13 VIDEO TIMING GENERATOR–FIELD GENERATOR–SLAVE MODE TIMING

VIDEO FRAME SYNCHRONIZATION OF INDEPENDENT TIMING GENERATORS FOR FRAME BUFFERS IN A MASTER-SLAVE CONFIGURATION

This is a continuation of application Ser. No. 08/408,268 filed Mar. 21, 1995, now abandoned.

BACKGROUND OF THE INVENTION

1. Field of the Invention

This invention relates to computer systems and, more particularly, to a RAMDAC (random access memory-digital-to-analog converter) used to transfer and process data from a frame buffer to an output display device.

2. History of the Prior Art

One of the significant problems involved in increasing the operational speed of desktop computers has been in finding ways to increase the rate at which information is transferred to an output display device. Many of the various forms of data presentation which are presently available require that large amounts of data be transferred. For example, if a computer output display monitor is operating in a color mode in which 1280×1024 pixels are displayed on the screen at once and the mode is one in which thirty-two bits are used to define each pixel, then a total of over forty million bits of information must be transferred to the screen with each individual picture (called a "frame" that is displayed. Typically, sixty frames are displayed each second so that over one and one-half billion bits must be transferred each second in such a system. This requires a very substantial amount of processing power.

In order to provide such a large amount of information to an output display device, computer systems typically utilize a frame buffer which holds the pixel data which is to be displayed on the output display.

Typically a frame buffer offers a sufficient amount of random access memory to store one frame of data to be displayed. The information in the frame buffer is transferred to the display from the frame buffer sixty or more times each second. After (or during) each transfer, the pixel data in the frame buffer is updated with the new information to be displayed in the next frame.

In DRAM frame buffers, pixel data may be read from the same port as data is written. VRAM frame buffers add a separate video data port so that the main pixel port remains free for rendering. Two-ported video random access memory (VRAM) or frame buffer random access memory (FBRAM) has been substituted for dynamic random access memory (DRAM) so that information may be transferred from the frame buffer to the display at the same time other information is being loaded into the frame buffer.

The data from the frame buffer is input to circuitry which converts the data from the frame buffer to a form usable by the output display device. FIG. 1 shows a computer system in which the present invention may be utilized where data in a memory 11 from a host CPU 12 is placed on host bus 13 and passed by rendering converter 14 to the frame buffer shown in FIG. 1 as VRAMs 15a–15d although FBRAMs may also be used. A RAMDAC 21 is coupled to the host bus through the rendering controller and to the frame buffer and includes a look-up table (or LUT which is the RAM part of the RAMDAC) and other elements for translating 16 bit data from the frame buffer to a 64 or 128 bit digital RGB signal which is converted by a digital to analog converter (DAC) to three analog signals representing voltage levels for red, blue and green which when combined at a pixel location in monitor 25 create a desired color at that pixel. The particulars of the frame buffer memory, rendering controller and monitor components are well known in the art and will not be described herein except as necessary for a proper understanding of the invention. In this connection, for the most part, the present invention is directed to certain improvements to RAMDAC 21 which provide the enhanced capabilities of the invention.

SUMMARY OF THE INVENTION

For certain applications including stereo display, virtual reality and video recording, it is required to synchronize the vertical blanking of multiple frame buffers. The frame buffers may exist on the same computer or separate computers.

A similar, but much more complex synchronization problem has been encountered and solved in television studios. There, it is necessary to cause cameras, encoders, special effects generators recorders and modulators to operate synchronously. A master generator provides the timing and frequency references, often referred to as Genlock, for the entire arrangement of equipment. However, generating a Genlock signal requires video sync filtering and acquisition hardware, which can add cost to a system.

All frame buffers in a group to be synchronized contain their own video timing generators. All are programmed to use the same video timing. Variations in the reference frequencies used by each frame buffer will eventually cause the frame buffer's video timing to drift relative to another frame buffer. Furthermore, without a mechanism for synchronizing the vertical sync event all frame buffers will have this event offset in time.

With this invention, one frame buffer is the master. It provides a signal called FIELD that changes state (0 to 1 or 1 to 0) at the start of every vertical sync event on the master frame buffer. All other frame buffers are set to be slaves. Their timing generators sample the master's FIELD signal. When they detect the master's FIELD signal changing state, they set their own internal timing to match. As implemented, all frame buffers use the transition of an internal counter from a nonzero value to zero as the vertical sync event. Slave frame buffers set their vertical counters to zero, and their internal field signal's state to that of the master's, when they detect a change in the master's field signal.

This provides a very inexpensive technique of achieving frame synchronization. Although it may not be as precise as Genlock, it is much simpler to implement.

BRIEF DESCRIPTION OF THE DRAWINGS

FIG. 13 shows field generator slave mode timing.

DETAILED DESCRIPTION OF THE INVENTION

A system utilizing two or more video monitors displaying related or contiguous images generated by two or more computers may exhibit aberrations in the viewed images because the computers do not operate from a single timing reference. The present invention provides a simple, low cost technique for sharply reducing such aberrations in the viewed images.

Figure 1:
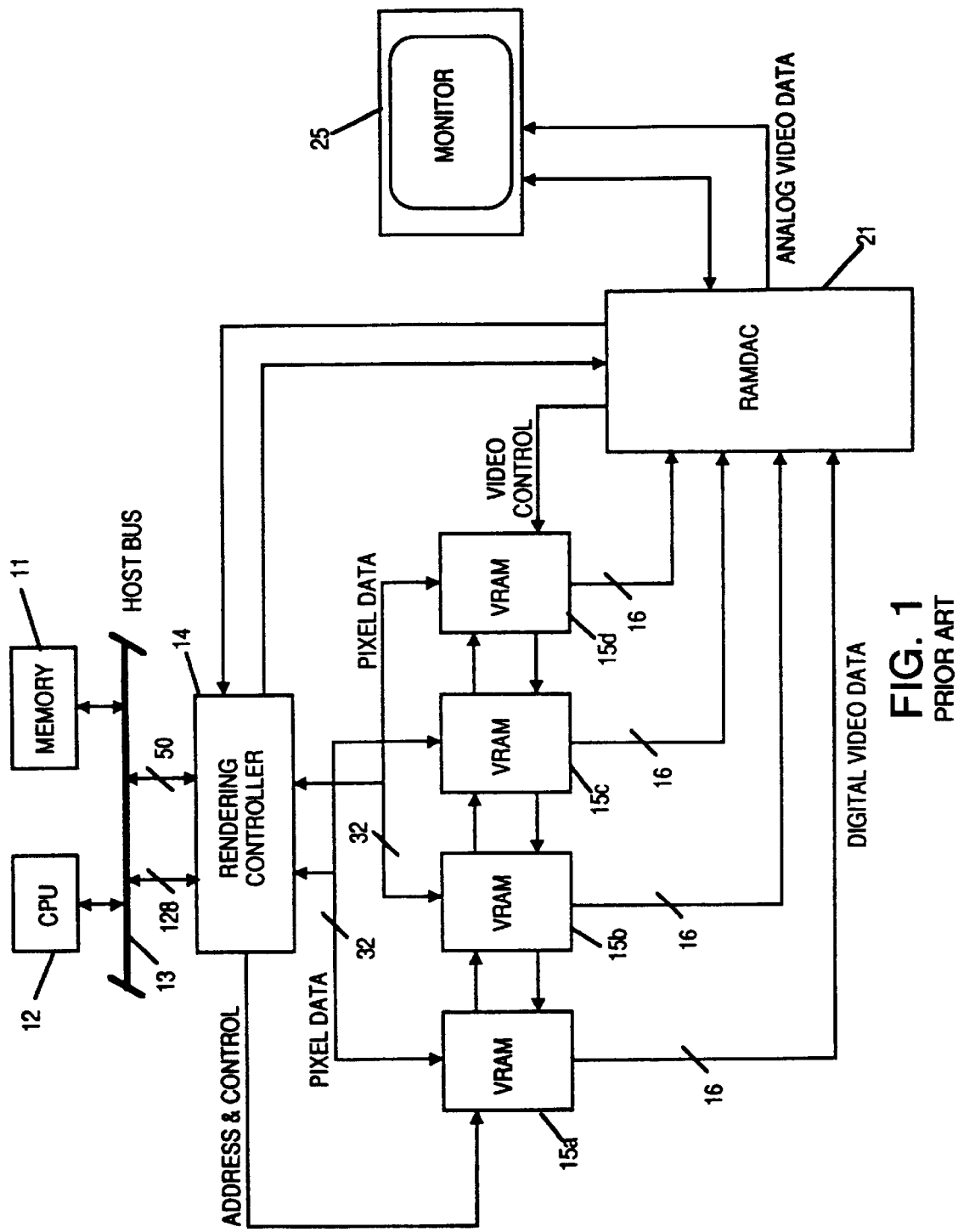
FIG. 1 is a block overview diagram showing a system in which the RAMDAC of the present invention may be utilized.
Figure 2:
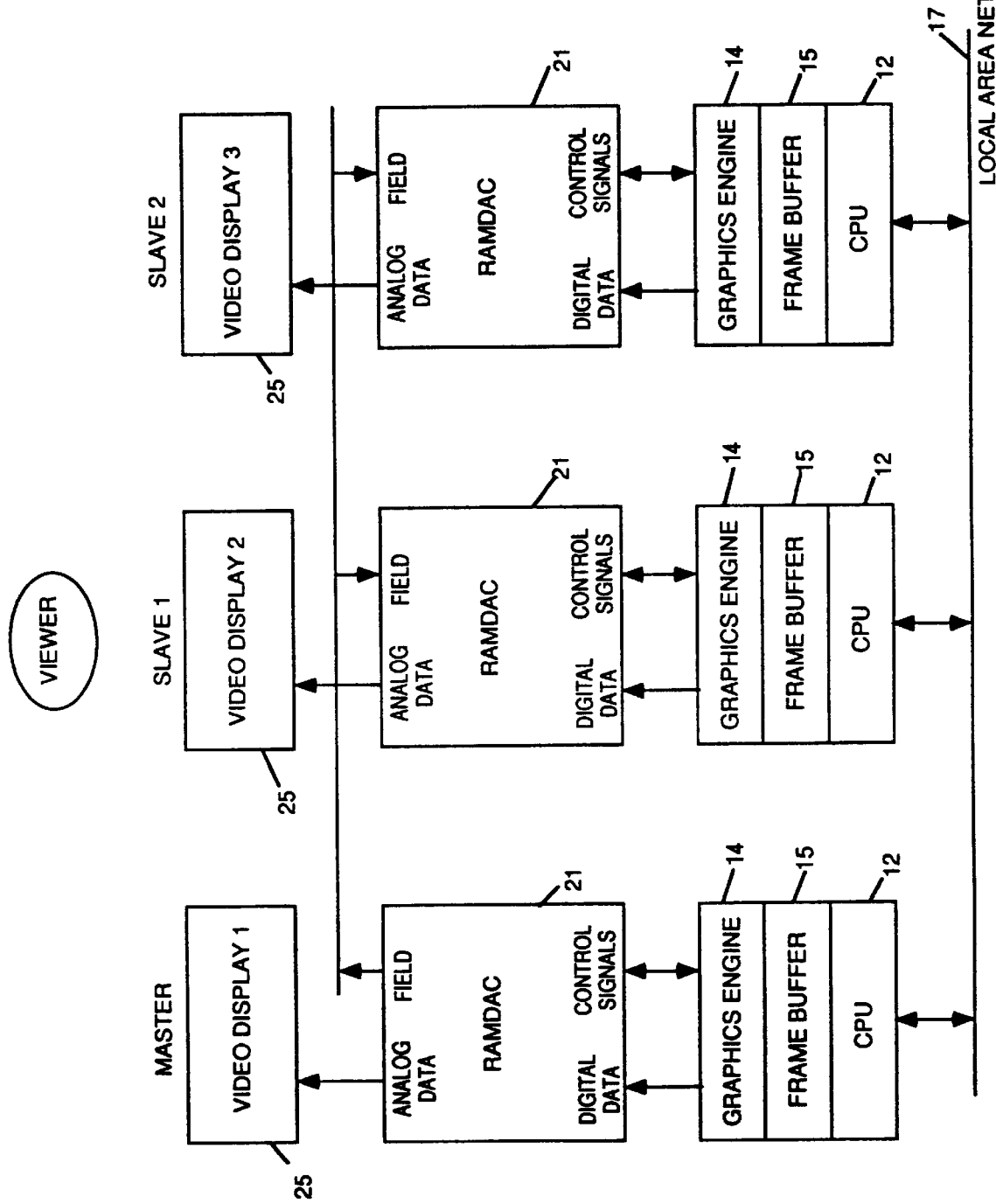
FIG. 2 is a block overview diagram showing three systems which operate in synchronism with each other utilizing the present invention

FIG. 2 represents a hypothetical arrangement having three systems; the number of systems may be increased or decreased without effect on the principle under discussion. Each of these systems includes a a monitor or other video display 25 RAMDAC 21, a graphics engine, or other video data source such as rendering controller 14, a frame buffer memory 15 and host computer 12. Components other than the RAMDAC, are included as an example of an implementation of the RAMDAC in a complete system. At the top of the illustration is a box labeled VIEWER which represents a person who observes the visual data presented on the three video displays.

One key feature of this arrangement is the nature of the displayed video data. The data are related to one another, so that all three displays are required to represent a complete scene. Also important is the fact that the displayed data are not static, they convey the impression of movement. For example, such an arrangement might be used as part of a flight simulator, wherein video display 2 provides the forward view from the simulator cockpit and video displays 1 and 3 provides the left and right views. Each of these displays may be stereoscopic displays, which impart a greater sense of "reality" to the simulation. In this case, each of the video displays must alternately and synchronously present left eye views and right eye views. The viewer wears special goggles which act as shutters for each eye, alternately and synchronously admitting left data to the left eye and right data to the right eye. The need for synchronization is clearly necessary, but synchronization is not a natural consequence of placing three video displays side by side as shown in FIG. 2. There are several reasons for this, all of them having to do with the clocks which regulate the rate at which processes occur in the RAMDAC, graphics engine and the host CPU and the quantity of data rendered by the graphics engine into the frame buffer.

Consider a single system, i.e., one of the three shown in FIG. 2. It is impractical to require all of the components of such a system to operate at one clock frequency. The CPU and the graphics engine are each designed to operate at the greatest possible clock frequency, but these frequencies may differ. The RAMDAC is required to operate at several frequencies, each of which is related to certain fundamental units of time, the pixel periods, defined by various video display formats. Consequently, the rate at which video data are rendered is not related to the rate at which video data must be displayed. This difference is reconciled by the frame buffer which accepts rendered data from the graphics engine at one rate and delivers these data to the RAMDAC at a different, usually faster, rate. This works well if the displayed data produce an image which is static. If motion (animation) is required, a larger frame buffer is needed. This large buffer is divided into two parts, referred to for convenience as buffers A and B. Each of these buffers is connected to the graphics engine and to the RAMDAC. This double buffering scheme works in this way. The first view of an animated sequence is rendered into buffer A. When the rendering is completed, the RAMDAC is told, by a control mechanism synchronized to the vertical blanking point of the video timing generator, to display data from buffer A. Once this is done, the CPU and the graphics engine begin rendering data for the next view into buffer B. When rendering is completed, the roles (rendering and display) of buffers A and B are again reversed. This process continues, resulting in the illusion of smooth motion (provided the rendering rate is sufficiently high) without noticeable aberrations. The point at which the buffer switching occurs is triggered by the completion of rendering and by the arrival of the subsequent video vertical blanking interval. The latter event is produced by the timing generator circuits of the RAMDAC and its external manifestation is a signal called the FIELD signal. A transition of the FIELD signal indicates that a new frame of video (a frame is one complete image) is about to start. In the implementation described herein, the direction of the FIELD signal transition, for non-interlace monoscopic displays, is irrelevant. However, the direction of the transition is very important for stereoscopic and interlaced displays. In the former case, the level of the FIELD signal indicates which of the stereoscopic views, left or right, is to be processed and displayed by the RAMDAC, video display and stereoscopic goggles, if present. In the latter case, the level of the FIELD signal identifies the current field as either the odd field or the even field.

When used in stereoscopic mode, the double buffered frame buffer is reorganized. Buffers A and B are retained but each one is again divided into two buffers. One of these holds data belonging to the left eye view and the other holds data belonging to the right eye view. The previously described rendering and display operations also apply in the stereoscopic mode.

FIG. 2 shows three systems which must display related or contiguous video data. Therefore, it is necessary for all systems to know when rendering of a particular video frame has been completed so that all systems can trigger the buffer switching operation at the same time. The time required for each system to complete its portion of the rendering task depends, in large part, on the contents of the scene being rendered. These contents will differ among the three systems. Consequently, the completion times will differ. Software and a local area network 17 are used to monitor the progress of rendering in the three systems. Once all systems have completed their rendering tasks, the buffer switching operation is triggered via the local area network. This facility solves one aspect of the synchronization problem. Another problem exists resulting from the fact that the timing references (clocks) for the three RAMDACs are independent of one another. Although the trigger for the buffer switching operation can be made to occur virtually simultaneously, the simultaneous transition of the three FIELD signals cannot be guaranteed by the described circuitry.

Each of the three RAMDACs receives clock signals generated by three independent, crystal controlled oscillators (not shown in FIG. 2) operating at a single nominal frequency. The actual frequencies produced by these oscillators will vary within a range of values (tolerance) which depends on the tolerance of the crystal resonator and local conditions such as temperature and, to some extent, voltage. In principle and practice it is not possible to guarantee that two, or more, such oscillators will produce the same frequency over an extended period of time. For example, assume three such oscillators connected not to video displays but to three counter circuits used by three watches. If all three systems were to be turned on at the same instant and the clocks compared after a few hours of operation, the indicated times would be different and the differences would grow over time. The same phenomenon will occur in the above-described hypothetical system shown in FIG. 2. Given sufficient time, the three systems will enter the video vertical blanking interval, as indicated by the FIELD signal, at different times. Should this occur in monoscopic systems, the disruption will be noticeable. In stereoscopic systems the effect will be dramatic since left and right eye views will not be coherent across the three systems.

The solution provided by the present invention does not seek to synchronize the three oscillators. Rather, it synchronizes events produced in the video timing generator circuits of the three RAMDACs (which are referenced to the oscillators). This approach exploits the fact that differences between the oscillators will be small if measured over a small interval of time. The period between successive FIELD signals is such a short interval (the period varies as a function of the particular video format, it is a maximum of 20 milliseconds and a minimum of about 13 milliseconds for the video formats supported in a typical implementation). In the illustrated hypothetical arrangement, system 1 is programmed to act as the master and systems 2 and 3 are programmed to act as slaves. As the arrowheads in the illustration indicate, the master system emits the FIELD signal and the slave systems receive it. Thus, system 1 becomes the source of the vertical interval timing reference and, in the stereoscopic mode, the controlling signal for stereoscopic goggles. The slaves respond to the received FIELD signal by resetting the counters (horizontal and vertical dimensions) which produce the video timing signals such as horizontal synch, vertical synch, and blanking The reset state is defined to be identical to the state which exists in the master RAMDAC at the time when it emits the transition in the FIELD signal, thus achieving the required synchronization. If the three systems are observed, it would be discovered that vertical blanking (or start of frame) occurs nearly simultaneously. The differences in the times at which these events occur are caused by delays incurred in the interconnecting cables and in the moment at which the counters are actually reset. These differences are very small (on the order of microseconds) and cannot be perceived by the viewer. The present invention lies in this method of achieving synchronization and the circuit elements utilized.

Figure 3:
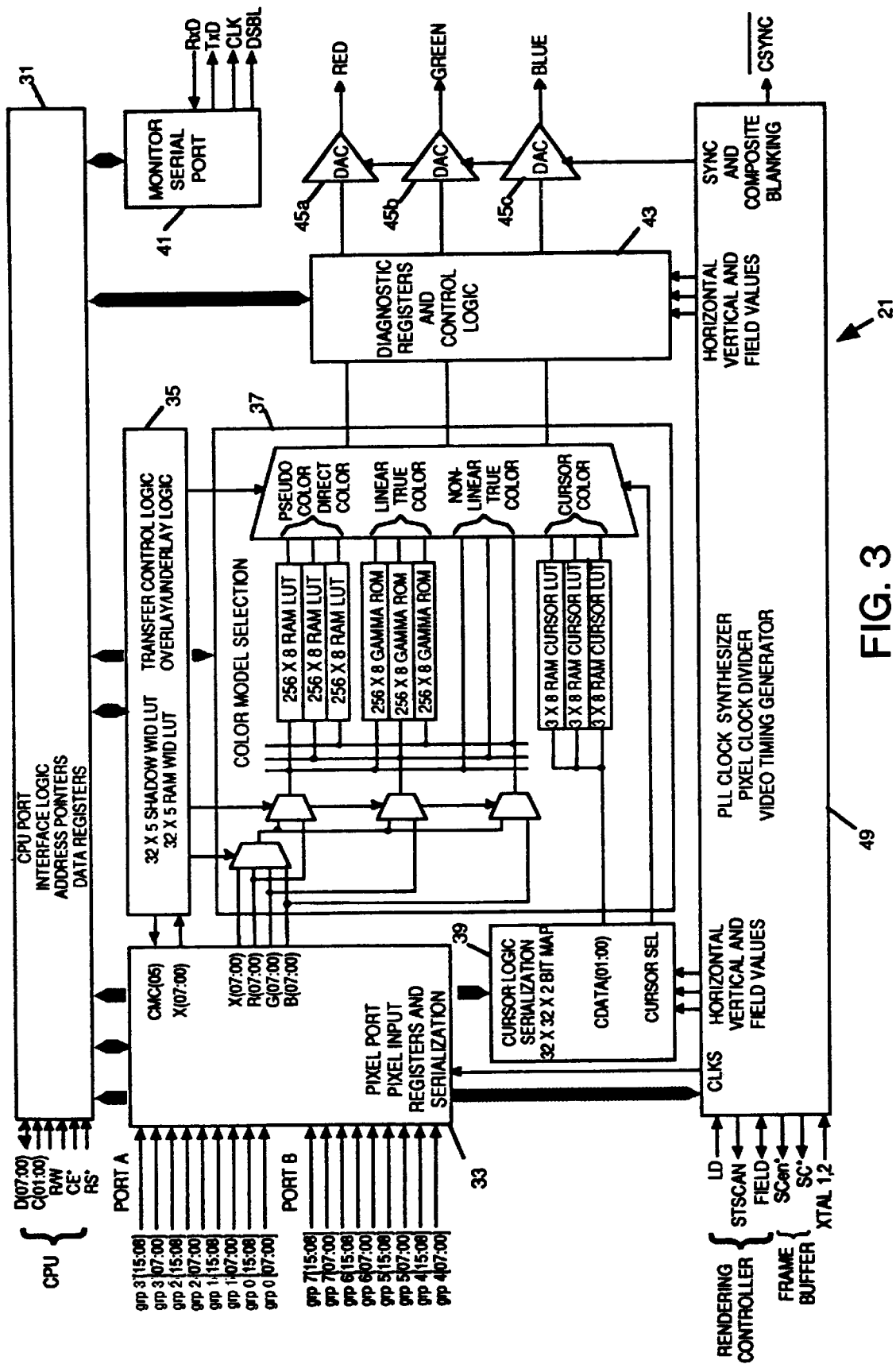
FIG. 3 is a detailed block diagram of a RAMDAC.

FIG. 3 illustrates the components of a RAMDAC 21 which can be utilized to implement the present invention. The RAMDAC includes several functional blocks as follows: CPU port, interface logic, address pointers and data registers 31, pixel port, pixel input registers and serialization 33, shadow and RAM look-up tables, transfer control and overlay, underlay logic 35, color model selection 37, cursor logic serialization 39, monitor serial port 41, diagnostic registers and control logic 43, digital-analog converters (DAC) 45a–45c and PLL clock synthesizer, pixel clock divider and video timing generator 49. The invention lies mainly in an implementation of the video timing generator component of PLL clock synthesizer, pixel clock divider and video timing generator 49 which generates a FIELD signal for use by other RAMDACs as described above to provide synchronization. Therefore, the following description will be limited to the video timing generator, with information pertaining to the other components of the RAMDAC provided only as needed for an understanding of the present invention. Although the other components shown in FIG. 3 may vary between RAMDACs of different manufacturers, persons skilled in the relevant art will recognize these various components and know how they or their equivalents may be implemented Frame buffer data is provided to the pixel port as pixel port signals such that the pixel inputs are divided into two ports, labeled A and B which consist of four groups per port. Furthermore, each group is divided into an upper byte and a lower byte. Thus, the pixel port comprises a total of 128 pixel bits contained in groups 0 through 7. Table 1 illustrates these assignments.

TABLE 1

Pixel Port Naming Convention

| Pixel Port | Group | Group Bits | Device Bits |
|---|---|---|---|
| B | 7 | [15:8] | PB(63–56) |
|   |   | [7:0]  | PB(55–48) |
|   | 6 | [15:8] | PB(47–40) |
|   |   | [7:0]  | PB(39–32) |
|   | 5 | [15:8] | PB(31–24) |
|   |   | [7:0]  | PB(23–16) |
|   | 4 | [15:8] | PB(15–08) |
|   |   | [7:0]  | PB(07–00) |
| A | 3 | [15:8] | PA(63–56) |
|   |   | [7:0]  | PA(55–48) |
|   | 2 | [15:8] | PA(47–40) |
|   |   | [7:0]  | PA(39–32) |
|   | 1 | [15:8] | PA(31–24) |
|   |   | [7:0]  | PA(23–16) |
|   | 0 | [15:8] | PA(15–08) |
|   |   | [7:0]  | PA(07–00) |

However, the specifics of the manner in which the frame buffer pixel data is provided to the pixel port of the RAMDAC may vary and is not critical to an understanding of the invention.

Video Timing Generator

The present invention utilizes a programmable timing generator, operating from a serial clock, and providing video display and video memory timing reference signals.

The timing generator produces signals which are described below. The timing generator operates in two dimensions, specifically, horizontal, corresponding to the horizontal scan of a video display format, and vertical, corresponding to the vertical scan of a video display format. Events in the horizontal dimension, such as horizontal synch, are placed on boundaries defined by the serial clock period. Events in the vertical dimension, such as vertical sync, are placed on boundaries defined by a whole number of horizontal scans in the case of non-interlaced displays, or by half horizontal scans in the case of interlaced displays. The number of serial clock periods within a horizontal scan is variable and the number of horizontal scans within a video frame is variable. The design of the timing generator provides that when generator outputs are observed at the outputs of the RAMDAC, they are correctly placed relative to the video data being input to the pixel port. For example, if the generator is programmed to assert some event congruent to pixel number p, then it will be seen, at the RAMDAC output, to occur at a position corresponding to pixel number p. The timing generator incorporates a rudimentary frame synchronization feature as described below. Finally, the timing generator incorporates a timing generator control register having control register bit definitions which are shown in Table 2, "Timing Generator Control Register," below. This register is read from and written to under control of host CPU 12 through the CPU port and interface logic which are coupled to multiplexed data/address bus D[07:00].

TABLE 2

Timing Generator Control Register

| Bit Field | R/W | Reset Value | Description |
|---|---|---|---|
| 0 Video Enable<br>(0) Disabled<br>(1) Enabled | R/W | 0 | Upon reset or writing a zero to this bit causes the DAC outputs to be blanked. Any signature acquired during video disable state will have pixel data set to be zero. |
| 1 Timing Generator Enable<br>(0) Disabled<br>(1) Enabled | R/W | 0 | Writing a one to this bit causes the timing generator to restart at the beginning of the upper left corner of an even frame. This change is effective at time next rising edge of the internal timing generator clock. Upon reset or writing a zero causes both horizontal and vertical counters to be disabled |
| 2 Horizontal Sync Disable<br>(0) HSYNC Enabled<br>(1) HSYNC Disabled | R/W | 0 | Upon reset or writing a zero causes the signals HSYNC* and CSYNC* to be enabled. Writing a zero disables the horizontal component of both signals |
| 3 Vertical Sync Disable<br>(0) VSYNC Enabled<br>(1) VSYNC Disabled | R/W | 0 | Upon reset or writing a zero causes the signals VSYNC* and CSYNC* to be enabled. Writing a zero disables the vertical component of both signals |
| 4 Equalization Disable<br>(0) Equalize Enabled<br>(1) Equalize Disabled | R/W | 0 | Equalization pulses happen if the chip is in interlaced mode and this bit is set to zero. Otherwise CSYNC should look like the non-interlaced case: horizontal syncs occur on CSYNC except during vertical sync; during vertical sync CSYNC has serration pulses. |
| 5 Master Mode<br>(0) Slave<br>(1) Master | R/W | 0 | This bit controls the direction of the FIELD I/O signal. When this bit is a logical zero, the RAMDAC uses the externally-provided FIELD signal to start at the top of a new frame. |
| 6 Interlaced Mode<br>(0) Non-Interlaced Mode<br>(1) Interlaced Mode | R/W | 0 | This field selects the mode of operation of the timing generator. A logical one causes the timing generator to operate in interlaced mode. |
| 7 Reserved | | | |

Frame Synchronization

The timing generator enables video frame synchronization of several displays. The timing generator is capable of operating either as a master or a slave as specified by bit 5 of the timing generator control register.

When the timing generator is operated as a master, the FIELD signal is an output producing the periodic functions described in Table 3, "Timing Generator Signal Description," below.

When the timing generator is operated as a slave the FIELD signal is an input which serves to set the horizontal and vertical elements of the generator so that they correspond to the start of vertical synch. Timing generators operated in the slave mode will not drive the FIELD signal. A further description of slave mode operation is described below.

System Reset

When asserted, the system reset signal, RS*, causes three effects as follows.

Video Enable (bit 0 of the timing generator control register) is forced to the disabled state by the assertion of system reset. This condition persists after the negation of system reset and stays in the disabled state until it is overwritten via the CPU port. Video Enable, when in the disabled state (i.e., reset), asserts composite blanking within the RAMDAC so that the video monitor remains black while the timing generator is being programmed to prevent random patterns or flashing from appearing on the display during, for example, a system boot when configuration and control data are being loaded into the timing generator.

When asserted, system reset forces the timing generator to assume a known state as follows. Timing Generator Enable (bit 1 of the timing generator control register) is forced to the disabled state by the assertion of system reset. This condition persists after the negation of system reset and stays in the disabled state until it is overwritten via the CPU Port. The purpose is to hold the timing generator in a known state while it is being programmed so that random FIELD, SC and SCen signals are not presented to other components of the system during such programming.

When asserted, system reset causes the timing generator to be in the slave mode. The FIELD signal is placed in a high impedance mode when the timing generator is in the slave mode.

Timing Generator Signals

The timing generator signals are described in Table 3, "Timing Generator Signal Description," below.

TABLE 3

Timing Generator Signal Description

| Signal Name | Description |
|---|---|
| CSYNC* | Composite Synch. This signal is conveyed to the video monitor as a discreet signal or, optionally, it is added to the Green channel DAC in the usual manner. The "synch on green" and other composite synch options are controlled by register programming. Composite Synch is the video synchronization signal and comprises horizontal and vertical, optionally serrated, synch components. For interlaced formats, such as NTSC and PAL, these components include horizontal equalization pulses. |

TABLE 3-continued

Timing Generator Signal Description

| Signal Name | Description |
| --- | --- |
| STSCAN | A pixel port output. External circuitry interprets this signal as "start of each visible horizontal scan line" and uses it to index the video memory. |
| FIELD | A pixel port bidirectional signal. FIELD is an input when the synch generator is operated in the slave mode; it is an output when the generator is operated in the master mode. In interlaced formats, FIELD differentiates odd and even fields. In non-interlaced sequential display formats, FIELD simply indicates the start of the frame. External circuitry uses FIELD to index the video memory and, to control LCD shutters used in stereographic viewing. FIELD changes state congruent to vertical synch. |
| SCen* | A pixel port output. Serial Clock enable is used by external circuitry to regulate the extraction of data from the serial port of the video memory. Assertion and negation of this signal are controlled by programmable registers in the horizontal SCen H Negation point, and SCen H Assertion point. SCen is active on unblanked lines as defined by VBlank Negation point and VBlank Assertion point. |

Timing Generator Display Formats

The timing generator is controlled by programming the appropriate values into the timing generator control registers. These registers are listed in Table 4, "Configuration Functions," below.

TABLE 4

Configuration Functions

Video Format Control Register
PLL Control Register
Transparent Overlay Mask Register
Transparent Overlay Color Key Register
Window Attribute - Active LUT
Window Attribute - Shadow LUT
Color LUT
Timing Generator Control Register
V-blank. Negation Point Register
V-blank. Assertion Point Register
V-sync. Negation Point Register
V-sync. Assertion Point Register
H-serration. Negation Point Register
H-blank. Negation Point Register
H-blank. Assertion Point Register
H-sync. Negation Point Register
H-sync. Assertion Point Register
HSCen, Negation Point Register
HSCen, Assertion Point Register
Equalization Pulse Negation Point Reg.
Equalization Interval Negation Point Reg.
Equalization Interval Assertion Point Reg.
Vertical Counter (R/O)
Horizontal Counter (R/O)
Device Identification Register
Signature Analysis Register
Monitor Serial Interface DATA Register
Monitor Serial Interface CNTL Register
DAC Control Register
Window Transfer Control Register Both interlaced and non-interlaced modes of operation are supported. All horizontal register values are in units of the serial clock rate. All vertical register values are in units of the horizontal lines. In a typical embodiment, the values to load into a register is one less than the desired count or duration. The programming of these modes is described in the following paragraphs.

Non-Interlaced Mode

In addition to serrated sync support for interlaced mode, the RAMDAC also supports the generation of serrated sync for non-interlaced mode. The composite sync is derived by using horizontal sync outside of the vertical sync interval, and using the serrated sync waveform during vertical sync interval. This is graphically depicted in FIG. 4, "Timing Generation-Non-Interlaced Format" with reference to the following description.

Horizontal Timing Generation

For generating the horizontal and serrated sync signals, the HSAP (horizontal sync assertion point), HSNP (horizontal sync negation point), and HSERNP (horizontal serration negation point) registers are programmed with the desired durations, in SC* clock units (serial clock described below). All the parameters should be programmed as one less than the desired duration.

Figure 4:
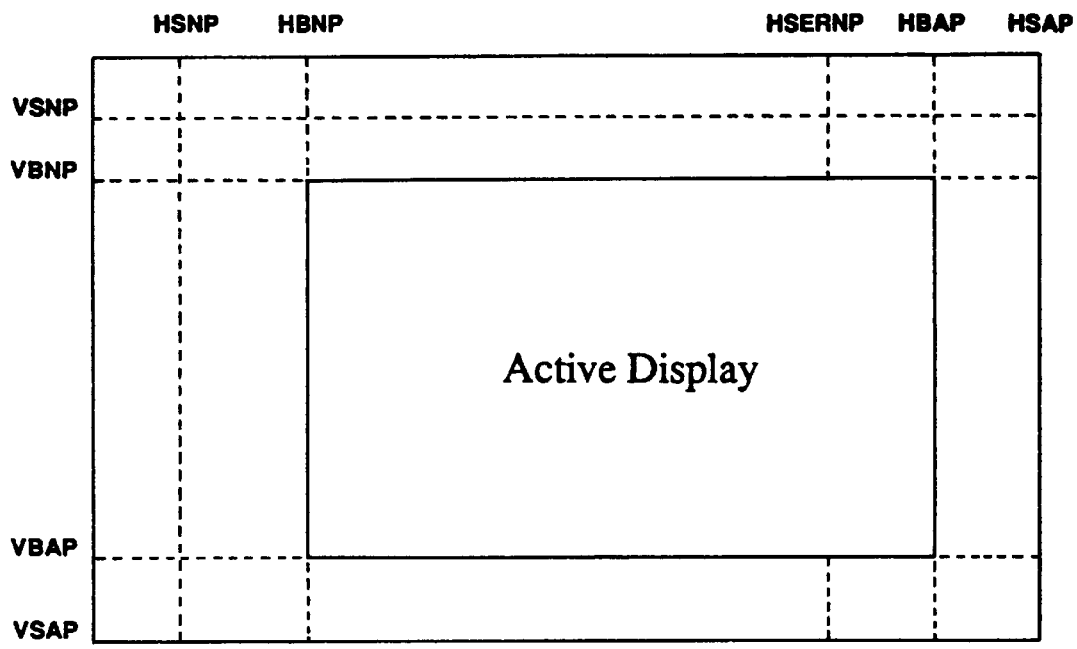
FIG. 4 shows timing generation for non-interlaced format.
Figure 5:
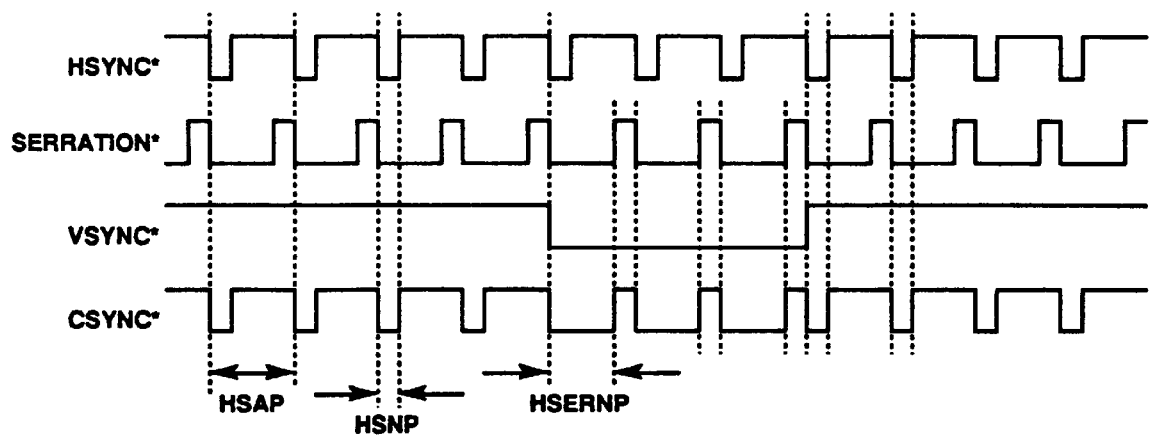
FIG. 5 shows horizontal timing and composite sync generation for non-interlaced format.

The operation may be described as follows: the horizontal counter begins at a value of zero, with the HSYNC* and SERRATION* waveforms active (i.e. low). When the counter reaches the HSNP value, HSYNC* is deasserted on the next serial clock. The horizontal counter continues counting up until the programmed HSERNP value is reached, at which point the SERRATION* waveform is deasserted on the next serial clock. The horizontal counter continues until the HSAP value is reached, after which the horizontal counter will be restarted at zero on the next serial clock. A diagram illustrating the relative register values related to active screen area is shown in FIG. 4, "Timing Generation-Non-Interlaced Format." Timing diagrams for the generation of composite sync are shown in FIG. 5, "Horizontal Timing and Composite Sync Generation-Non-Interlaced Format."

The generation of the horizontal blanking signal is relatively straightforward-HBLANK* is asserted on the next serial clock, after the horizontal counter reaches the value programmed in the HBAP (Horizontal Blank Assertion Point) register. HBLNK* is then deasserted on the next serial clock, after the horizontal counter reaches the value programmed in the HBNP (Horizontal Blank Negation Point) register.

The horizontal timing register values should satisfy the following relationships:

0<HSNP<HBNP<HBAP<HSAP

Vertical Timing Generation

The VSYNC* vertical timing signal is generated using the values contained in the VSNP (Vertical Sync Negation Point) and VSAP (Vertical Sync Assertion Point) registers. The VBLANK* vertical timing signal is generated using the values contained in the VBAP (Vertical Blank Assertion Point) and VBNP (Vertical Blank Negation Point) registers. In non-interlaced mode, all vertical timing register intervals are specified in units of horizontal lines (i.e. the load period HSAP). The vertical timing counter is incremented at each horizontal sync assertion time; subsequently, the only time that any vertical timing signals may transition is at HSYNC* assertion.

The vertical timing registers should be programmed to satisfy the following relationship:

0<VSNP<VBNP<VBAP<VSAP

The composite blanking signal is derived by logically OR'ing HBLANK* with VBLANK*.

Interlaced Mode

In interlaced mode, and due to the nature of the composite sync and video signals during the equalization and vertical sync intervals, timing events are based on half-line quantities.

Horizontal Timing Generation

Figure 6:
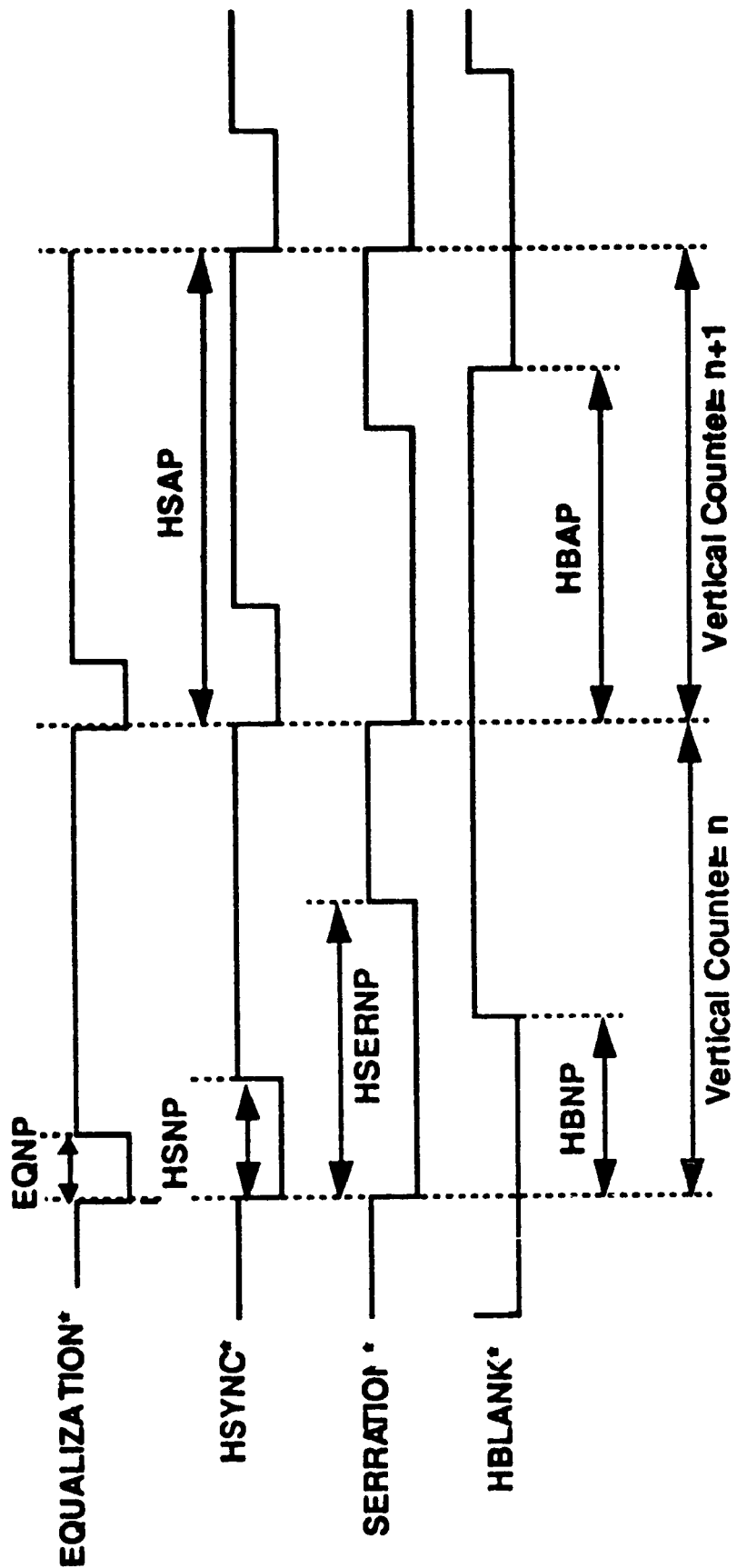
FIG. 6 shows horizontal timing waveforms for interlaced format.

The HSYNC* and SERRATION* waveforms are generated in the same form as for non-interlaced mode; except that the HSYNC* and SERRATION* waveforms occur twice for each scan line. The contribution of these signals to the generation of the composite sync/video waveforms for interlaced mode is explained below. The HSYNC* and SERRATION* waveforms do not depend on scan line or the state of the FIELD signal; they are generated using only the contents of the horizontal counter. However, HBLANK* generation is also a function of the current FIELD and vertical scan line counter. The relationships between the programmed register values and the waveforms are shown in FIG. 6, "Horizontal Timing Waveforms-Interlaced Format." In this figure, for an even field, the value of n would be even, and for an odd field the value of n would be odd. The truth table for generating the horizontal blanking signal is shown in Table 5.

TABLE 5

Horizontal Blank Generation-Interlaced Format

| Field | Assert HBLANK* on next serial clock when | | Deassert HBLANK* on next serial clock when | |
|---|---|---|---|---|
| | Horizontal Counter = | and Vertical Counter is | Horizontal Counter = | and Vertical Counter is |
| Even | HBAP | Odd | HBNP | Even |
| Odd | HBAP | Even | HBNP | Odd |

Vertical Timing Generation

The registers used for vertical events in interlaced mode are the VSAP (Vertical Sync Assertion Point), VSNP (Vertical Sync Negation Point), EIAP (Equalization Interval Assertion Point), EINP (Equalization Interval Negation Point), VBAP (Vertical Blank Assertion Point), and VBNP (Vertical Blank Negation Point). Some vertical timing signals depend only on the vertical counter value (VSYNC*, EQUALIZATION*); others also depend on the current field (VBLANK*, FIELD).

The vertical counter is incremented at each leading edge of the internal HSYNC* signal; hence, all vertical timing registers must be programmed using half-line quantities (e.g. VSAP for NTSC has 525 half lines. For 525 half lines, VSAP is programmed as 524). The truth table for generating the vertical blanking signal is shown in Table 6, "Vertical Blank Generation-Interlaced Mode," below.

TABLE 6

Vertical Blank Generation-Interlaced Mode

| Field | Assert VBLANK* on next HSYNC* leading edge when | | Deassert VBLANK* on next HSYNC* leading edge when | |
|---|---|---|---|---|
| | Vertical Counter ≥ | and Vertical Counter is | Vertical Counter > | and Vertical Counter is |
| Even | HBAP | Odd | HBNP | Even |
| Odd | HBAP | Even | HBNP | Odd |

The vertical timing registers should satisfy the following relationship:

0<VSNP<EINP<VBNP<VBAP≦EIAP≦VSAP

Composite Sync Generation

Figure 7:
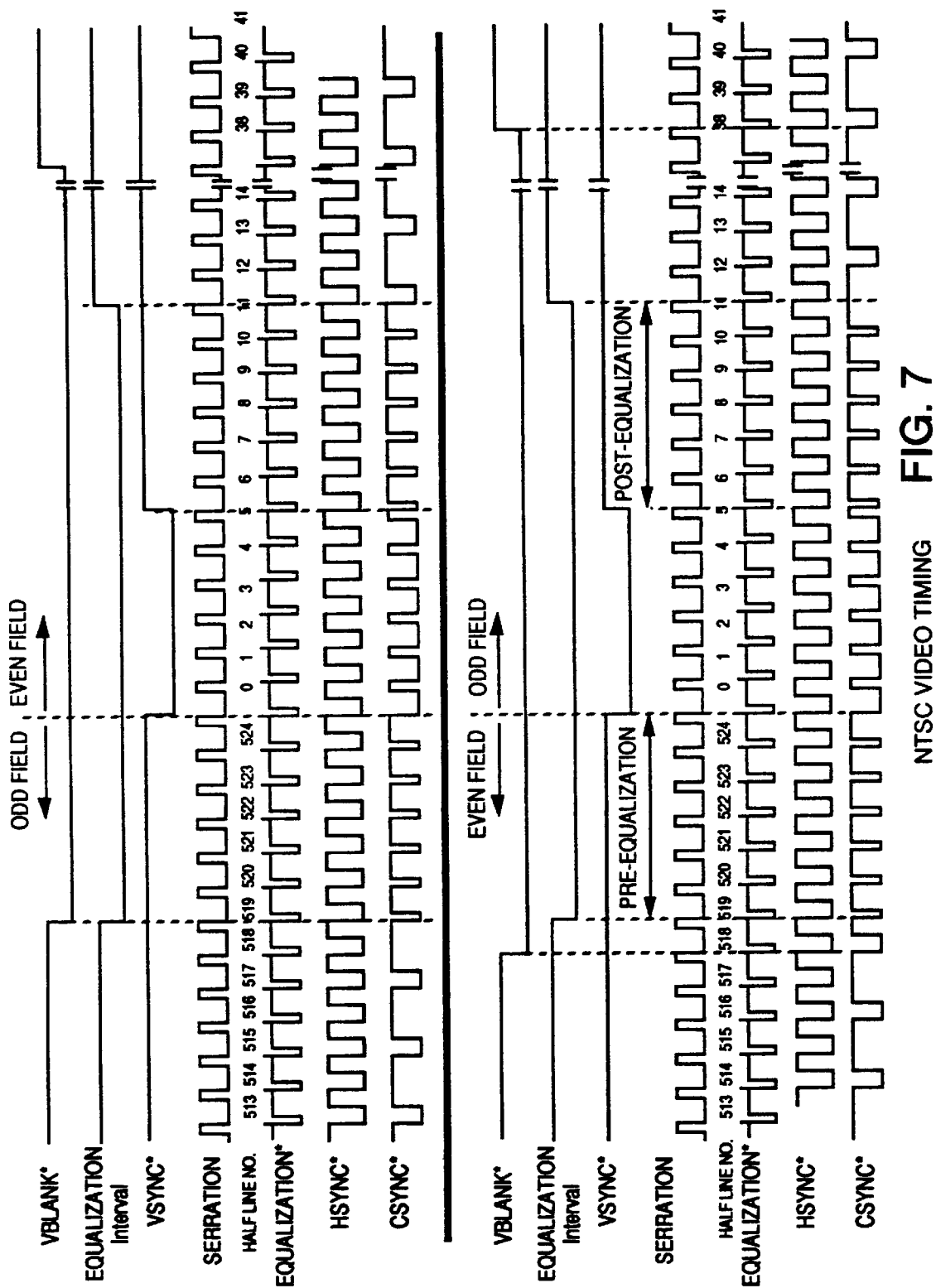
FIG. 7 shows NTSC video timing.

The composition of the composite sync signal during the various frame intervals is shown in Table 7, "Composite Sync Generation-Interlaced Format," below. The relationships between the HSYNC* and SERRATION* signals relative to the VBLANK*, VSYNC*, and EQUALIZATION* signals and vertical counter values are illustrated in FIG. 7, "NTSC Video Timing."

TABLE 7

Composite Sync Generation-Interlaced Format

| Field | During Interval | Assert CSYNC* on next serial clock when | | Deassert CSYNC* on next serial clock when | |
|---|---|---|---|---|---|
| | | HCounter = | and VCounter is | HCounter = | and VCounter is |
| | Other | HSAP | Even | HSNP | Even or Odd |
| Odd | Pre-equalization or Post-equalization | HSAP | Even or Odd | EQNP | Even or Odd |
| | Vertical Sync | HSAP | Even or Odd | HSERNP | Even or Odd |
| | Other | HSAP | Odd | HSNP | Even or Odd |
| Even | Pre-equalization or Post-equalization | HSAP | Even or Odd | EQNP | Even or Odd |
| | Vertical Sync | HSAP | Even or Odd | HSERNP | Even or Odd |

When HSYNC* and/or VSYNC* is disabled with the controls shown in Table 2, "Timing Generator Control Register," the composite SYNC is as shown in Table 8, "Composite Sync Output when HSYNC* & VSYNC* Enabled/Disabled."

TABLE 8

Composite Sync Output when HSYNC* & VSYNC* Enabled/Disabled

| Mode | HSYNC* | VSYNC* | CSYNC output |
|---|---|---|---|
| Non-interlaced | enabled | enabled | Normal operation |
| | enabled | disabled | CSYNC* looks like HSYNC* (no serrations) |
| | disabled | enabled | CSYNC* looks like VSYNC* (no serrations) |
| | disabled | disabled | CSYNC* inactive |
| Interlaced | enabled | enabled | Normal operation |
| | enabled | disabled | Undefined |
| | disabled | enabled | Undefined |
| | disabled | disabled | CSYNC* inactive |

Output Signals

The RAMDAC provides the following timing generator outputs: SC*, SCen*, STSCAN, FIELD, and CSYNC*. The composite signal waveform is as previously described; the timing at the CSYNC* output pin is consistent with the analog DAC outputs.

FIELD Output

The FIELD signal, when in master mode, transitions with the leading edge of the internal VSYNC*; additionally, the level is used to output the current field when in interlaced mode (logical zero=even field, logical one=odd field). In non-interlaced mode, transitional edges of this signal will still occur near the leading edge of every VSYNC*, however the level of the FIELD signal has no meaning; externally it may be used to differentiate between left and right views of a stereo display STSCAN Output This output is an internally generated signal This signal may be used by the memory controller of the host CPU to determine the proper row transfer address timing for the frame buffer serial port. The STSCAN logic will set the STSCAN at the falling edge of SCen if the next line is visible and reset the STSCAN at the rising edge of SCen.

SCen Output

The SCen (Serial clock enable) output is used for enabling the clocking of the serial data from the frame buffer memories. The assertion of SCen is controlled by programming the timing generator registers VBNP, VBAP, HSCenAP (Horizontal Serial Clock Enable Assertion Point), and HSCenNP (Horizontal Serial Clock Enable Negation Point).

Slave Mode Operation

When the timing generator control register is programmed to slave mode, the timing generator accepts the FIELD signal as an input. In this mode, a transition occurring on this input will cause the vertical counter to be reset at the subsequent horizontal sync occurrence. If the RAMDAC is in interlaced mode, the level that the FIELD signal input transitions to will determine which field is current (i.e. a high-to-low transition causes the timing generator to start at the top of an even field on the next HSYNC* leading edge). Since the horizontal counters are not reset, eventually the clock drift will cause vertical sync for the slave to be one line longer, or the blanked front porch to be one line shorter.

Figure 8:
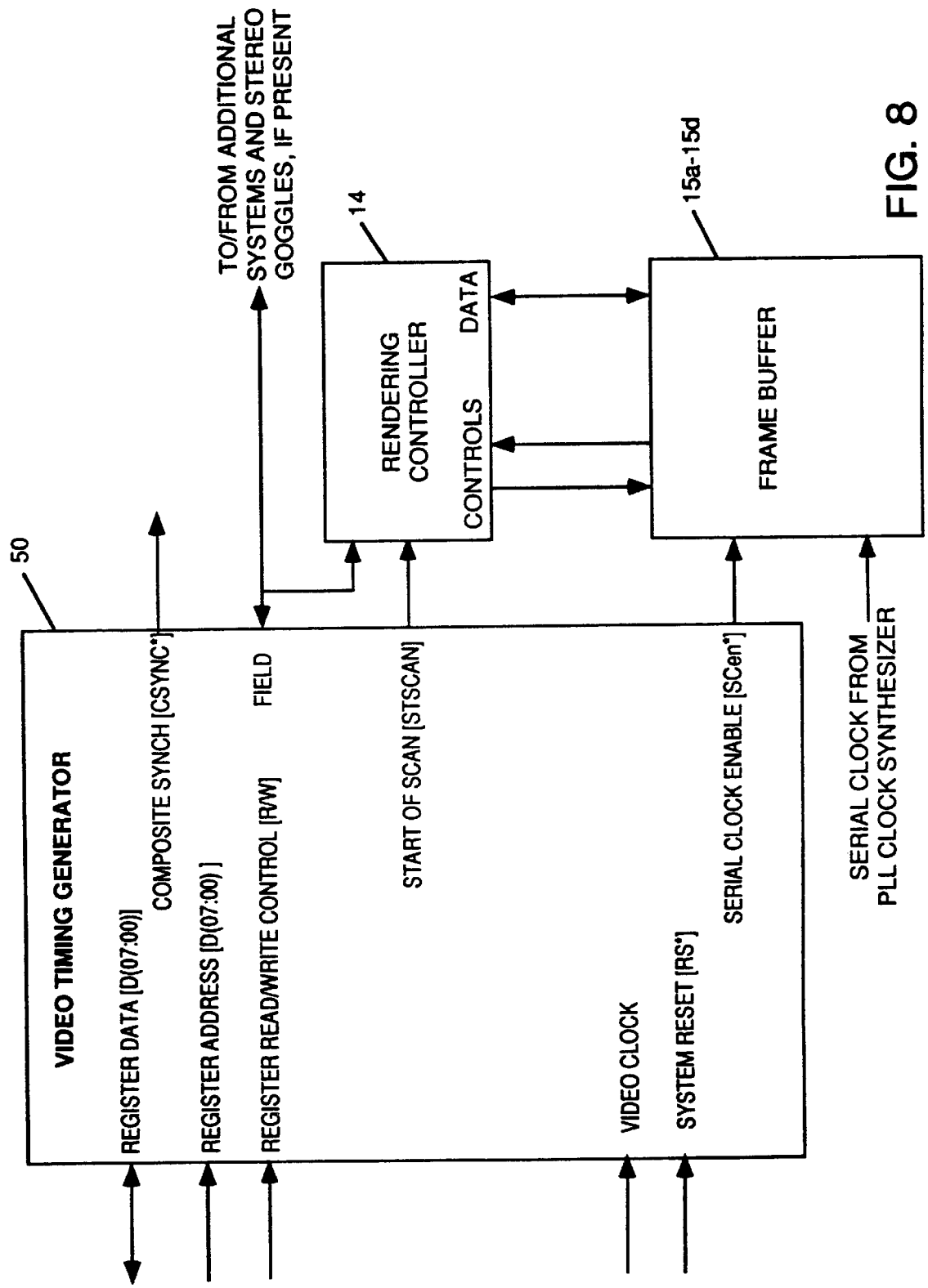
FIG. 8 is a block overview diagram of the video timing generator of the present invention.

FIG. 8 is a block overview diagram showing the signals input to and output from the video timing generator 50 of the present invention. The signals shown correspond to the signals with the same names described above with reference to FIG. 3, excepting that Register Address is an address placed on D[07:00] and multiplexed with data placed on D[07:00], The video clock signal and the serial clock signal are produced by the PLL clock synthesizer and pixel clock divider components of digital-analog converters (DAC) 45a–45c and PLL clock synthesizer, pixel clock divider and video timing generator 49 shown in FIG. 3 from a crystal oscillator input in a manner well known to those skilled in the art. The serial clock signal (SC*) is generated for the external clocking of the VRAM frame buffer and for the internal clocking of the video timing generator FIG. 8 depicts the interfaces connecting the video timing generator 50, the VRAM frame buffer 15a–15d and rendering controller 14. The purpose of this diagram is to show all of the paths taken by the FIELD signal. The connection to the rendering controller is provided to explain how the left and right eye video data are obtained from the frame buffer. In the rendering controller, the FIELD signal functions as a portion of the address which is passed to the frame buffer for copying video data from main memory into its serial shift registers. Video data are clocked out of these shift registers by the action of the serial clock, SC*, and the serial clock enable, SCen*, signals.

When stereoscopic mode is active, the frame buffer memory is organized such that a single bit of address is sufficient to differentiate between memory locations containing left eye video data and those containing right eye video data.

Figure 9:
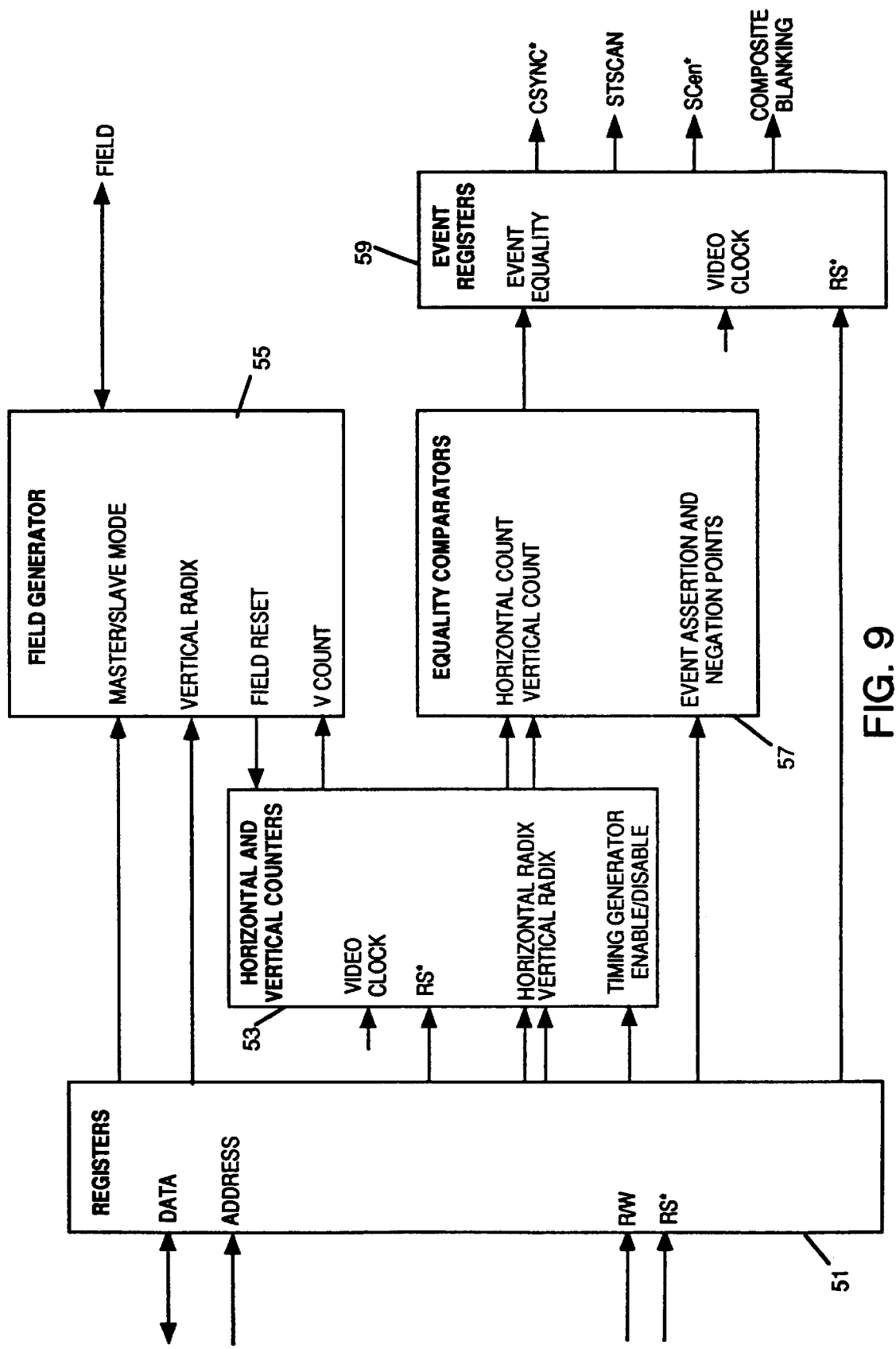
FIG. 9 is a detailed block diagram of the video timing generator of the present invention.

FIG. 9 is a detailed block diagram showing the various functional blocks used to implement a video timing generator according to the present invention. The functional blocks are registers 51, horizontal and vertical counters 53, field generator 55, equality comparators 57 and event registers 59. Again, the signals shown correspond to the signals with the same names described above with reference to FIG. 3. Horizontal radix and vertical radix are set to the number of pixels on each scan line and the number of scan lines respectively for the video display connected to the RAMDAC. Vertical count is the current scan line and horizontal count is the current pixel on the current scan line. Event assertion and negation points are the values stored in registers 51 as shown in Table 4 and are loaded by the host CPU. Equality comparators 57 are a set of comparators which compare the horizontal and vertical counts to their respective radix values. The horizontal and vertical counts change on video clock boundaries. The operation of equality comparators 57 produces an output which toggles a corresponding flip-flop shown in FIG. 9 as event registers 59. The outputs of the flip-flops produce the CSYNC*, STSCAN, SCen* and composite blanking signals.

Figure 10:
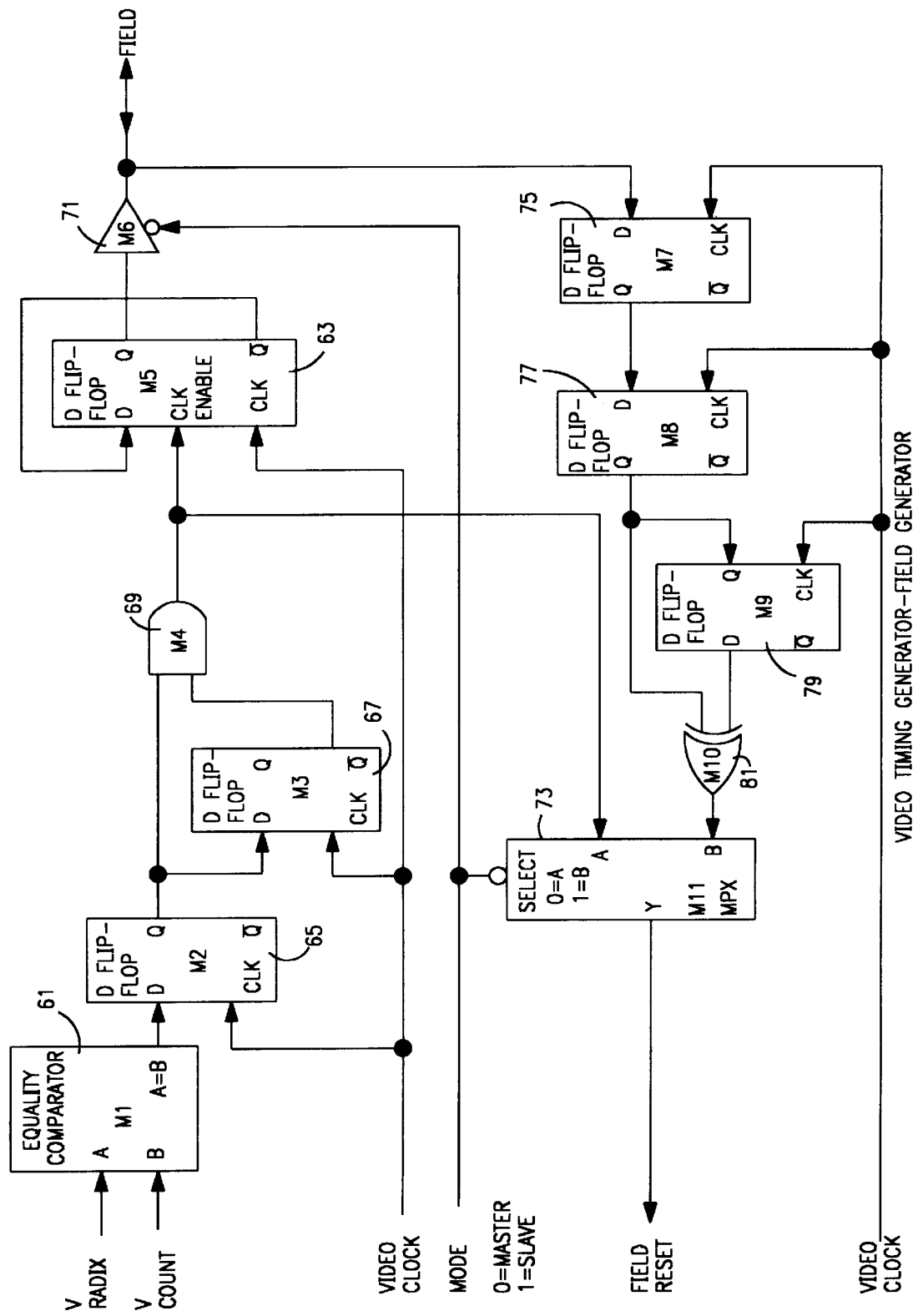
FIG. 10 is a logic gate implementation of the video timing generator of the present invention.

Referring to FIG. 10, field generator 55 generates the FIELD signal as follows. Equality comparator 61 (M1) receives the output of the vertical counter, V COUNT and the vertical radix, V RADIX. The former changes continuously, while the latter is a static value contained in a programmable register. The output of M1 is asserted when the two input values are equal in magnitude. V COUNT represents the number of the video line currently being processed. Consequently, the output of M1 will remain asserted for a period of time equal to that of one video scan line. It is necessary to process the output of M1 so that the resulting signal is referenced to the leading edge of M1 output assertion and is one video clock period in duration and is insensitive to the negation of the M1 output. If this is not done, then flip-flop 63 (M5) will toggle as long as its clock enable input is asserted. The circuit comprised of flip-flop 65 (M2), flip-flop 67 (M3) and AND gate 69 (M4) operate as an edge discriminator which performs the task.

The output of the edge discriminator (M4) is the clock enable input of flip-flop M5, whose output will toggle while clock enable is asserted. Because the clock enable signal is made to be one clock period in duration, the output of flip-flop M5 will change state once per video field. Tri-state driver 71 (M6), receives the output of flip-flop M5, and, if the master mode has been selected, drives the FIELD signal.

Note that the output of the edge discriminator M4 is also connected to the A input of the multiplexor 73 (M11). When the master mode is selected, the multiplexor passes the output of the edge discriminator. The resulting signal is called FIELD RESET. It is used to reset the horizontal and vertical counters of the video timing generator.

If the circuit is operated in the slave mode, tri-state driver M6 enters the high impedance state and no longer drives the signal FIELD. Instead, the FIELD signal becomes an input to the field generator 55, The selection of the slave mode also causes the B input of multiplexor M11 to be selected (in the master mode, the action of flip-flops M7, M8, M9 and gate M10 is of no importance).

The (now) externally supplied FIELD signal is referenced to a clock (in another system) which operates at the same nominal frequency as the local clock. However, the phase relationships of the local clock to the external clock and the signals derived from these clocks can only be defined as variable. Therefore, it is necessary to guard against metastability. Flip-flops 75 and 77 (M7 and M8) are hardened against metastability and are used to synchronize the externally supplied FIELD signal to the local clock (such hardened flip-flops are commonly found in ASIC cell libraries).

The FIELD signal is a square wave whose points of transition are congruent to vertical synch. Each transition point, therefore, corresponds to the point in time where V COUNT is equal to V RADIX. In order to reset the vertical and horizontal counters correctly, it is necessary to detect these transitions Flip-flop 79 (M9) and XOR gate 81 (M10) form a transition detector which is insensitive to the direction of the transition producing an output pulse with a duration of one video clock period. Since slave mode has been selected, multiplexor M11 passes the output of gate M10 and drives the FIELD RESET signal.

Figure 11:
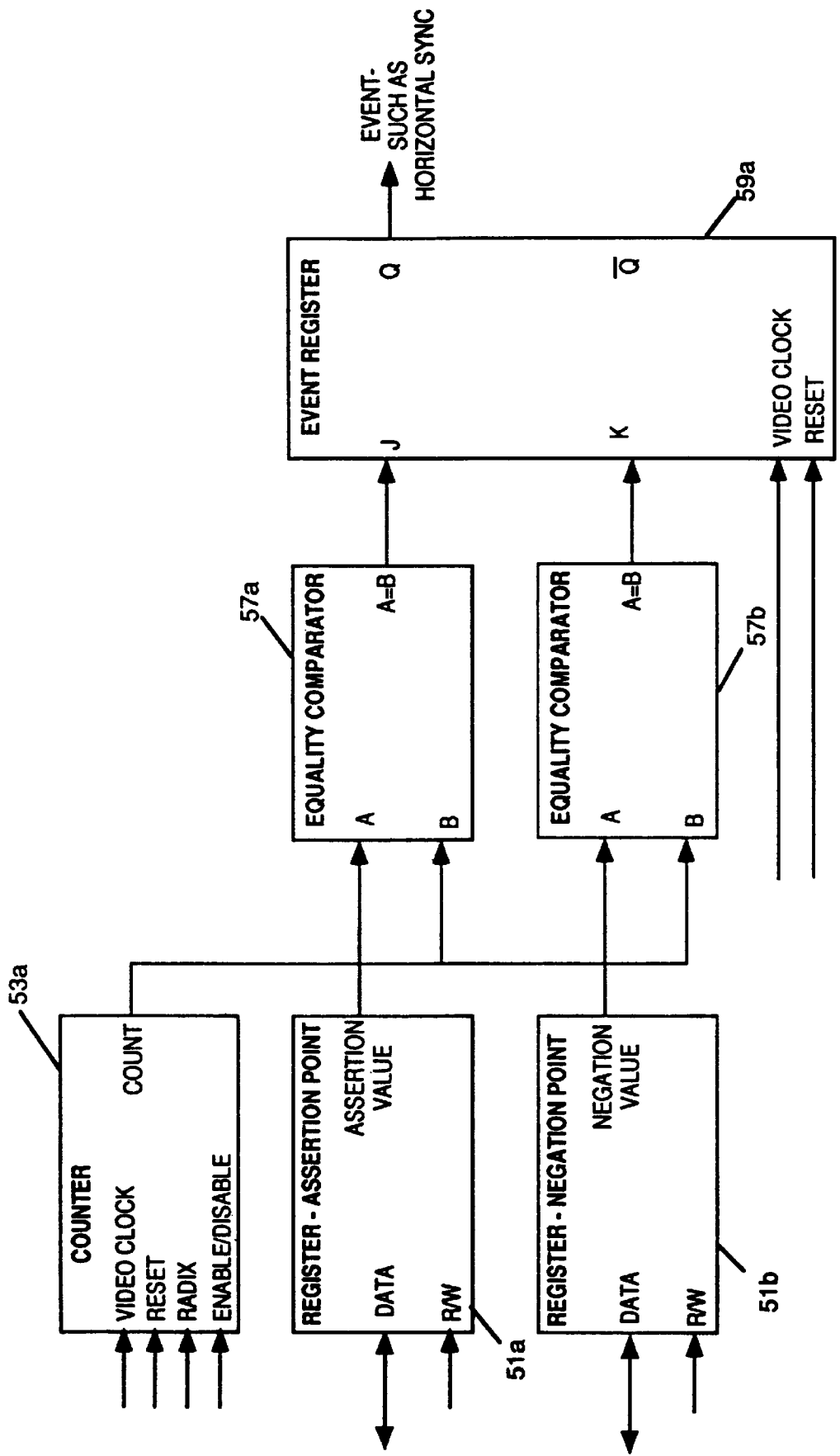
FIG. 11 is a detailed block diagram showing the operation of equality comparators.

Further details concerning the operation of equality comparators 57 are described with reference to FIG. 11. FIG. 11 represents the comparisons performed to generate a particular timing signal of the video timing generator. Counter 53a is loaded with the radix of the timing signal. Counter 53a increments each video clock and the count is provided to comparators 57a and 57b. The comparators 57a and 57b compare the current count with the assertion point value and negation point value previously loaded in registers 51a and 51b respectively. The comparators toggle event register 59a, which is a JK flip-flop, based on the comparison results, and the output of the flip-flop provides the particular timing signal.

Figure 12:
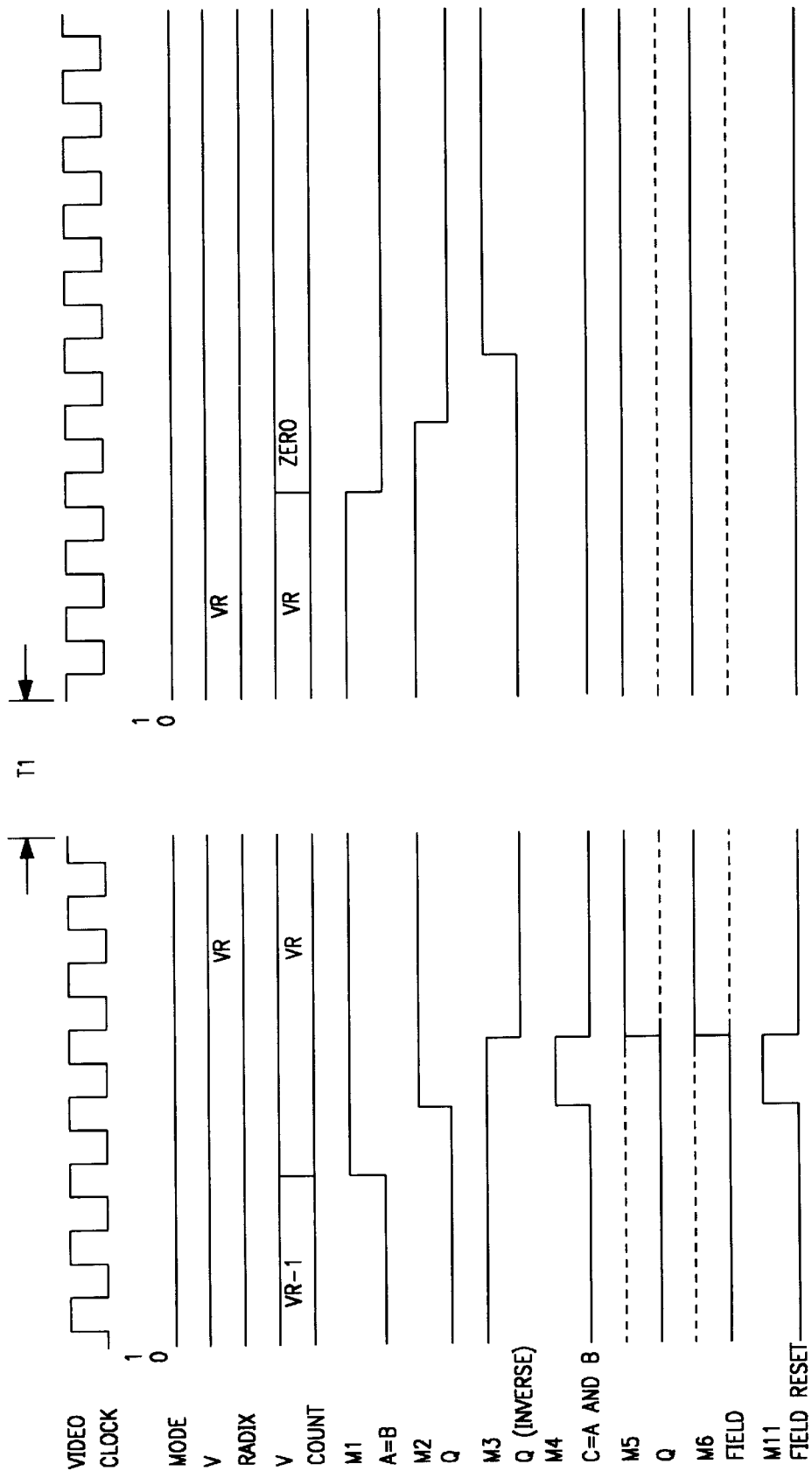
FIG. 12 shows field generator master mode timing.

FIG. 12 shows the timing of the signals produced within field generator 55 for master mode timing. FIG. 13 shows the timing of the signals produced within field generator 55 for slave mode timing.

We claim:

1. An apparatus for synchronizing a vertical blanking signal for each of a plurality of independent frame buffers comprising:

a plurality of RAMDACs, each for coupling to a corresponding rendering controller and a display monitor which receives video signals, wherein one of said plurality of RAMDACs operates as a master and each of the other of said plurality of RAMDACs operates as a slave, each of said RAMDACS including logic which generates a vertical blanking signal, each of said slave RAMDACs including reset logic which generates a signal which resets said vertical blanking signal logic;

wherein said RAMDAC operating as a master further comprises a field signal generator which generates a field signal which is provided to each of said plurality of RAMDACs operating as a slave, and each of said slave RAMDACs upon receipt of said field signal operates said reset logic to thereby synchronize the video signals provided to its corresponding display monitor.

2. The apparatus defined by claim 1 wherein said logic which generates said vertical blanking signal comprises:

a vertical counter which is incremented at each leading edge of an internal HSYNC* signal.

3. The apparatus defined by claim 2 wherein:

said vertical blanking signal is asserted during an even field when the vertical counter is an odd number greater than or equal to a value stored in a horizontal blank assertion point register and during an odd field when the vertical counter is an even number greater than or equal to a value stored in the horizontal blank assertion point register; and said vertical blanking signal is deasserted during an even field when the vertical counter is an even number greater than a value stored in a horizontal blank negation point register and during an odd field when the vertical counter is an odd number greater than a value stored in the horizontal blank negation point register.

4. The apparatus defined by claim 2 wherein said reset logic comprises a circuit which receives said field signal as an input and processes said received field signal to generate a field reset signal.

5. The apparatus defined by claim 2 wherein said reset logic circuit comprises:

a) a first flip-flop which receives said field signal as an input;

b) a second flip-flop coupled to an output of said first flip-flop;

c) a third flip-flop coupled to an output of said second flip-flop;

d) an XOR gate coupled to an output of said third flip-flop;

e) a multiplexor having one input coupled to an output of said XOR gate and a second input coupled to an output of an edge discriminator.

6. The apparatus defined by claim 1 wherein said field signal generator comprises:

a) a comparator;

b) a first flip-flop coupled to an output of said comparator;

c) a second flip-flop coupled to an output of said first flip-flop;

d) an AND gate coupled to an output of said second flip-flop;

e) a third flip-flop coupled to an output of said AND gate;

f) a tri-state driver coupled to an output of said third flip-flop.

7. The apparatus defined by claim 1 further comprising:

a) a set of registers including a VSAP (Vertical Sync Assertion Point) register, a VSNP (Vertical Sync Negation Point) register, an EIAP (Equalization Interval Assertion Point) register, an EINP (Equalization Interval Negation Point) register, a VBAP (Vertical Blank Assertion Point) register, and a VBNP (Vertical Blank Negation Point) register;

b) horizontal and vertical counters coupled to said set of registers and said field signal generator;

c) equality comparators coupled to said horizontal and vertical counters and said set of registers; and d) event registers coupled to said equality comparators and said set of registers.

8. The apparatus defined by claim 7 wherein said set of registers further comprises a HSNP (Horizontal Sync Negation Point) register, a HBNP (Horizontal Blank Negation Point) register, a HBAP (Horizontal Blank Assertion Point) register, and a HSAP (Horizontal Sync Assertion Point) register containing values having the relationship O<HSNP<HBNP<HBAP<HSAP.

9. The apparatus defined by claim 7 wherein the VSNP, EINP, VBNP, VBAP, EIAP and VSAP registers contain values having the relationship O<VSNP<EINP<VBNP<VBAP≦EIAP≦VSAP.

10. A method for synchronizing a vertical blanking signal for each of a plurality of independent frame buffers comprising the steps of:

a) designating one of a plurality of RAMDACs, each for coupling to a corresponding rendering controller and a display monitor which receives video signals, as a master and designating each of the other of said plurality of RAMDACs as a slave;

b) generating a vertical blanking signal for each of said plurality of independent frame buffers;

c) synchronizing the video signals provided to the display monitor coupled to each of said plurality of RAMDACs by generating a field signal which is provided to each of said plurality at RAMDACs operating as a slave, said slave RAMDACs, upon receipt of said field signal, operating to reset logic used for generating the vertical blanking signal to thereby synchronize the video signals to be provided to its corresponding display monitor.

11. The method defined by claim 10 wherein said vertical blanking signal generating step comprises the step of;

incrementing a vertical counter at each leading edge of an internal HSYNC* signal.

12. The method defined by claim 11 wherein:

said vertical blanking signal is asserted during an even field when the vertical counter is an odd number greater than or equal to a value stored in a horizontal blank assertion point register and during an odd field when the vertical counter is an even number greater than or equal to a value stored in the horizontal blank assertion point register; and said vertical blanking signal is deasserted during an even field when the vertical counter is an even number greater than a value stored in a horizontal blank negation point register and during an odd field when the vertical counter is an odd number greater than a value stored in the horizontal blank negation point register.

13. The method defined by claim 10 wherein said operating to reset logic step comprises the steps of:

a) receiving said field signal as an input; and b) processing said received field signal to generate a field reset signal.

* * * * *